United States Patent Office.

BENJAMIN ROBINSON, OF EAST GLOUCESTER, MASSACHUSETTS.

Letters Patent No. 78,016, dated May 19, 1868.

IMPROVED PROCESS OF OBTAINING GELATINE FROM FISH-HEADS.

The Schedule referred to in these Letters Patent and making part of the same.

TO ALL PERSONS TO WHOM THESE PRESENTS MAY COME:

Be it known that I, BENJAMIN ROBINSON, of East Gloucester, in the county of Essex, and State of Massachusetts, have invented a new and useful Process of Obtaining Gelatine from the Heads of Cod or other Fish; and I do hereby declare the same to be fully described as follows:

In carrying out my process, I put the heads into a strong vessel, which I subsequently close, so as to be steam-tight. I next introduce steam into the vessel and upon the heads, and subject them to its action for about one hour, after which I remove them from the vessel, and place them in and compress them by a powerful press, such as is used for expressing oil from meat or fish. The compression of the steamed heads separates the gelatine from them, which will exude from the openings of the press-box, and may be collected as it escapes therefrom.

What I claim as my invention, is—

The process described, for obtaining gelatine from the heads of fish.

BENJ. ROBINSON.

Witnesses:
R. H. EDDY,
F. P. HALE, Jr.